United States Patent
Tomita et al.

(10) Patent No.: US 9,500,811 B2
(45) Date of Patent: Nov. 22, 2016

(54) OPTICAL CIRCUIT (71) Applicants: NTT ELECTRONICS CORPORATION, Yokohama-shi, Kanagawa (JP); NIPPON TELEGRAPH AND TELEPHONE CORPORATION, Tokyo (JP)

(72) Inventors: Hiroshi Tomita, Yokohama (JP); Kenji Kobayashi, Yokohama (JP); Naoki Ooba, Yokohama (JP); Toru Miura, Atsugi (JP)

(73) Assignees: NTT Electronics Corporation, Kanagawa (JP); Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 14/428,872

(22) PCT Filed: Sep. 17, 2013

(86) PCT No.: PCT/JP2013/075017
§ 371 (c)(1),
(2) Date: Mar. 17, 2015

(87) PCT Pub. No.: WO2014/057775
PCT Pub. Date: Apr. 17, 2014

(65) Prior Publication Data
US 2015/0247970 A1    Sep. 3, 2015

(30) Foreign Application Priority Data
Oct. 10, 2012 (JP) ................... 2012-224667

(51) Int. Cl.
G02B 6/35 (2006.01)
G02B 26/08 (2006.01)

(52) U.S. Cl.
CPC ............. *G02B 6/3518* (2013.01); *G02B 6/356* (2013.01); *G02B 26/0833* (2013.01); *G02B 6/3512* (2013.01)

(58) Field of Classification Search
None
See application file for complete search history.

(56) References Cited

U.S. PATENT DOCUMENTS 6,829,086 B1 * 12/2004 Gibilini ................ G03B 21/625
                                                               359/453
8,198,787 B2    6/2012 Nakayama et al.
2006/0033979 A1 * 2/2006 Gupta et al. ....... G02B 26/0833
                                                               359/290

(Continued)

FOREIGN PATENT DOCUMENTS

CN    101009772 A    8/2007
CN    102109629 A    6/2011

(Continued)

OTHER PUBLICATIONS

International Preliminary Report and Written Opinion in corresponding Application No. PCT/JP2013/075017 dated Apr. 15, 2015.

(Continued)

*Primary Examiner* — Mike Stahl
(74) *Attorney, Agent, or Firm* — Workman Nydegger (57) ABSTRACT

Disclosed is an optical circuit including a transparent plate, which is light-transmittable, and a light shielding plate, which is adhered to the transparent plate with an adhesive and has an opening through which incident light passes, and in which the aspect facing to the opening has, on the side opposite to the transparent plate, projections in an overhang shape toward the center of the opening.

17 Claims, 11 Drawing Sheets

(56) References Cited

U.S. PATENT DOCUMENTS

| | | | | |
|---|---|---|---|---|
| 2006/0119919 A1* | 6/2006 | Watson et al. | ..... | G02B 26/0833 359/214.1 |
| 2006/0139758 A1* | 6/2006 | Segawa et al. | .. | B29D 11/00278 359/619 |
| 2008/0316562 A1* | 12/2008 | Sanders et al. | .... | G02B 26/0833 359/212.1 |
| 2009/0008669 A1* | 1/2009 | Maeda et al. | ...... | G02B 26/0841 257/98 |
| 2010/0073531 A1* | 3/2010 | Yano et al. | .............. | B26D 3/08 348/294 |
| 2011/0242376 A1* | 10/2011 | Ando | ................ | H01L 27/14623 348/294 |

FOREIGN PATENT DOCUMENTS

| | | |
|---|---|---|
| JP | 61-077728 | 4/1986 |
| JP | 2005-92055 | 4/2005 |
| JP | 2007-148042 | 6/2007 |
| JP | 2009-194744 | 8/2009 |
| JP | 2010-022931 | 2/2010 |
| JP | 2011-008105 | 1/2011 |
| JP | 2011-095533 | 5/2011 |

OTHER PUBLICATIONS

International Search Report in corresponding App No. PCT/JP2013/075017 dated Oct. 29, 2013.
Japanese Office Action for Japanese Patent Application No. 2012-224667 with mailing date of Dec. 15, 2015.
Supplementary European Search Report for EP 13 84 6016 dated May 31, 2016.
Japanese Office Action for JP Patent Application No. 2012-224667 with mailing dated of Jun. 28, 2016.
Chinese Office Action for CN Patent Application No. 201380052946.6 with mailing dated of Jul. 11, 2016.

* cited by examiner

OPTICAL CIRCUIT

TECHNICAL FIELD

The present invention relates to optical circuits. More specifically, the present invention relates to an optical circuit including a light-transmittable transparent plate and a light shielding plate adhered to the transparent plate with an adhesive.

BACKGROUND ART

In recent years, an optical fiber telecom industry utilizes wavelength division multiplexing (WDM) technology to deal with an increase in communication data amount. A wavelength selective switch (WSS) has been known as an optical device constructing a large-capacity optical communication system using the WDM technology.

The WSS is a device which selects any wavelength from a WDM signal input thereto and can allocate the selected wavelength to any output. Basically, the WSS typically has an input/output portion through which the WDM signal is input or output, a dispersive element which demultiplexes and multiplexes the WDM signal, a light-condensing element which condenses a plurality of light beams generated by demultiplexing the signal, and an optical deflection device having optical deflection elements deflecting the light beams to switch output.

As the WSS, a MEMS (Micro Electro Mechanical System) advantageous in terms of optical signal transmission band characteristics, optical loss, and polarization dependency has been mainly used, and a wavelength selective switch having a MEMS mirror has been known as an optical deflection device (for example, see Patent Literature 1).

Meanwhile, such a wavelength selective switch has a challenge in preventing stray light from an unused MEMS mirror from being coupled to a fiber. In order to overcome the challenge, means for shielding light with the use of a drive circuit driving the unused MEMS mirror has been considered; however, since an extra drive circuit is needed to drive the MEMS mirror not normally used, there has been a problem that cost is increased. Thus, there has been adopted a configuration in which while light is partially allowed to pass through an opening formed in a surface of a glass member near the MEMS mirror, a light shielding plate (mask) used to shield other portions from light is attached with an adhesive to thereby suppress stray light.

Figure 10:
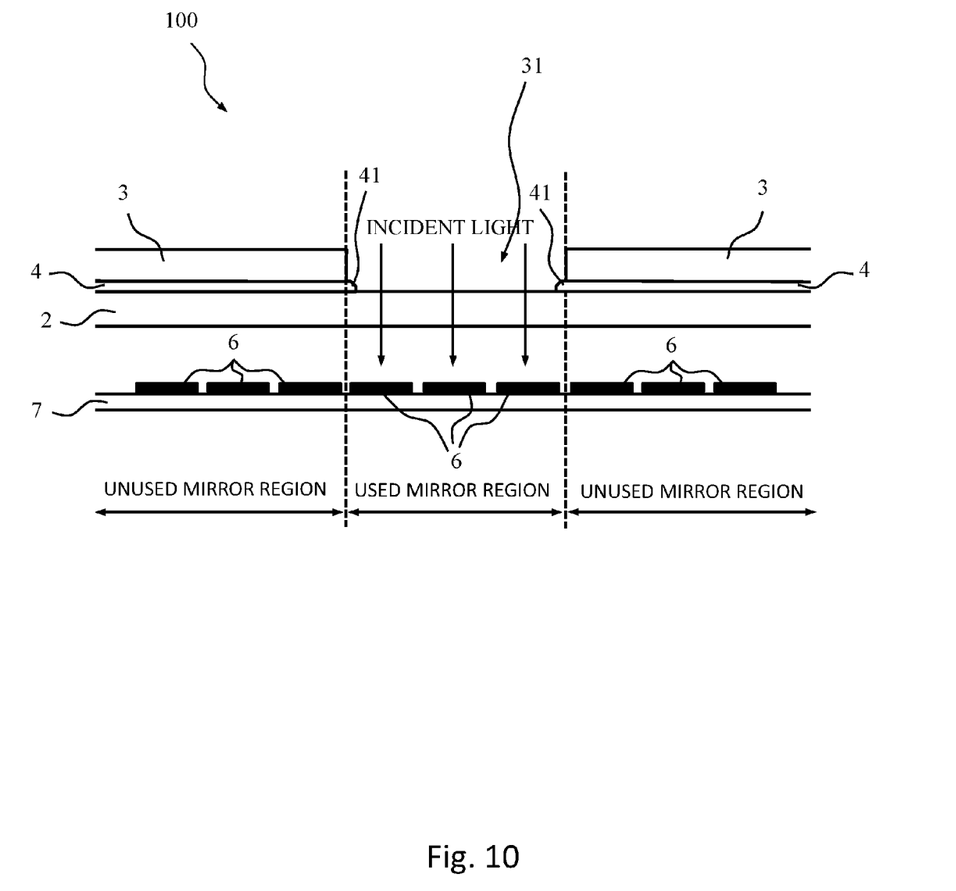
FIG. 10 is a schematic view showing an aspect of a conventional wavelength selective switch module.

FIG. 10 is a schematic view showing a conventional wavelength selective switch module 100, and the module 100 includes a light-transmittable transparent plate 2, a light shielding plate 3 which is adhered to the transparent plate 2 with an adhesive 4, has an opening 31 through which light can pass, and shields incident light other than light entering the opening 31, MEMS mirrors 6 which are located on the side opposite to the light shielding plate 3 across the transparent plate 2 and receive incident light, and a substrate 7 with the MEMS mirrors 6 mounted thereon. In FIG. 10, in the MEMS mirrors 6, a region receiving incident light is described as a "used mirror region", and a region shielded from light by the light shielding plate 3 and thus receiving no incident light is described as an "unused mirror region".

CITATION LIST

Patent Literature

[Patent Literature 1] JP 2007-148042 A

SUMMARY OF INVENTION

Technical Problem

However, when the light shielding plate 3 is attached onto the surface of the glass member with the adhesive 4, the adhesive 4 may protrude from an end of the light shielding plate 3 to the opening 31 corresponding to a region where light passes. Meanwhile, a protrusion 41 of the adhesive 4 in the opening 31 as a path through which light passes may adversely affect light passing through the opening 31. For example, the protrusion 41 of the adhesive 4 may cause loss of light, which is to pass through the opening 31 and then be irradiated to the used mirror region, causing an irregularity of an amount of light reflected by the MEMS mirrors 6; and what is worse, the loss of light due to the protrusion 41 of the adhesive 4 may cause an increase in noise. Moreover, there is a problem that when light is reflected by the protrusion 41 of the adhesive 4, this causes cross-talk.

In view of the above problems, the present invention provides an optical circuit which prevents an adhesive protruding to an opening corresponding to a region through which light passes in a light shielding plate from adversely affecting light passing through the opening.

Solution to Problem

In order to achieve the above object, the present invention provides an optical circuit including a light shielding plate processed so that the aspect facing to an opening has an overhang shape.

More specifically, the optical circuit of the present invention includes a transparent plate which is light-transmittable and a light shielding plate, in which the light shielding plate is adhered to the transparent plate with an adhesive and has an opening through which incident light passes, and in the opening, the light shielding plate has, on the side opposite to the transparent plate, a projecting portion in an overhang shape toward the center of the opening.

Since the present invention provides an optical circuit, in which the opening is formed in the light shielding plate, adhered to the transparent plate with the adhesive, and serving as a path for light, and the light shielding plate has the projecting portion, on the side opposite to the transparent plate, in an overhang shape toward the center of the opening, therefore the projecting portion conceals a protrusion of the adhesive when the transparent plate and the light shielding plate are adhered to each other with the adhesive and prevents the protrusion of the adhesive from adversely affecting on an optical path; thereby, yielding an optical circuit which can exercise transmission characteristics as designed.

In the optical circuit according to the above-described invention, it is preferable in the light shielding plate that the shape of the aspect facing to the opening in a cross section vertical to the light shielding plate is linear from the front end on the side opposite to the transparent plate toward the front end on the transparent plate side.

As the projecting portion is thusly formed at an acute angle, the protrusion of the adhesive can be reliably concealed; and in addition, as the cross section of the protrusion is formed into a linear shape from the front end on the side opposite to the transparent plate toward the front end on the transparent plate side, the light shielding plate can be easily processed.

In the optical circuit according to the above-described invention, it is preferable in the light shielding plate that the shape of the aspect facing to the opening in a cross section vertical to the light shielding plate is two straight lines crossing each other from the front end on the side opposite to the transparent plate toward the front end on the transparent plate side, and a portion where the two straight lines cross each other has a convex shape toward the center of the opening.

As the projecting portion is thusly formed at an acute angle, the protrusion of the adhesive can be reliably concealed; and in addition, as the cross section is the two straight lines crossing each other from the front end on the side opposite to the side facing the transparent plate toward the front end on the transparent plate side, an angle of an edge can be increased, so that the edge is strengthened. Since a portion where the two straight lines cross each other has a convex shape toward the center of the opening, the protrusion of the adhesive can be easily concealed as compared with a single linear shape.

The optical circuit according to the above-described invention further includes a plurality of optical elements receiving incident light and a substrate on which the plurality of optical elements is mounted; and in this optical circuit, it is preferable that the substrate on which the plurality of optical elements is mounted is located on the side opposite to the light shielding plate across the transparent plate, and the light shielding plate is located so that the center of a beam of the incident light passing through the opening is projected to the center of the optical element.

As the light shielding plate is thus located with respect to the incident light, the incident light passing through the opening is efficiently irradiated to the MEMS mirrors.

The optical circuit according to the above-described invention further includes a plurality of optical elements receiving incident light and a substrate on which the plurality of optical elements is mounted; and in this optical circuit, it is preferable that the substrate on which the plurality of optical elements is mounted is located on the side opposite to the light shielding plate across the transparent plate, and the light shielding plate is located so that outside end of a beam of the incident light passing through the opening is projected into the optical element.

As the light shielding plate is thus located with respect to the incident light, the incident light passing through the opening is efficiently irradiated to the MEMS mirrors.

Advantageous Effects of Invention

In the optical circuit according to the present invention, the opening is formed in the light shielding plate, adhered to the transparent plate with the adhesive, and serving as a path for light and the light shielding plate has the projecting portion, on the side opposite to the transparent plate, in an overhang shape toward the center of the opening; therefore, the projecting portion conceals a protrusion of the adhesive when the transparent plate and the light shielding plate are adhered to each other with the adhesive and prevents the protrusion of the adhesive from adversely affecting on an optical path, thereby yielding an optical circuit which can exercise transmission characteristics as designed.

DESCRIPTION OF EMBODIMENTS

Hereinafter, embodiments of the present invention will be described using the drawings. The embodiments are examples of the present invention, and the present invention is not limited to the following embodiments. Those examples are merely illustrative, and the present invention can be embodied with various modifications and changes based on the knowledge of those skilled in the art. Components denoted by the same reference numerals herein and the drawings mutually denote the same ones.

Embodiment 1

Figure 1:
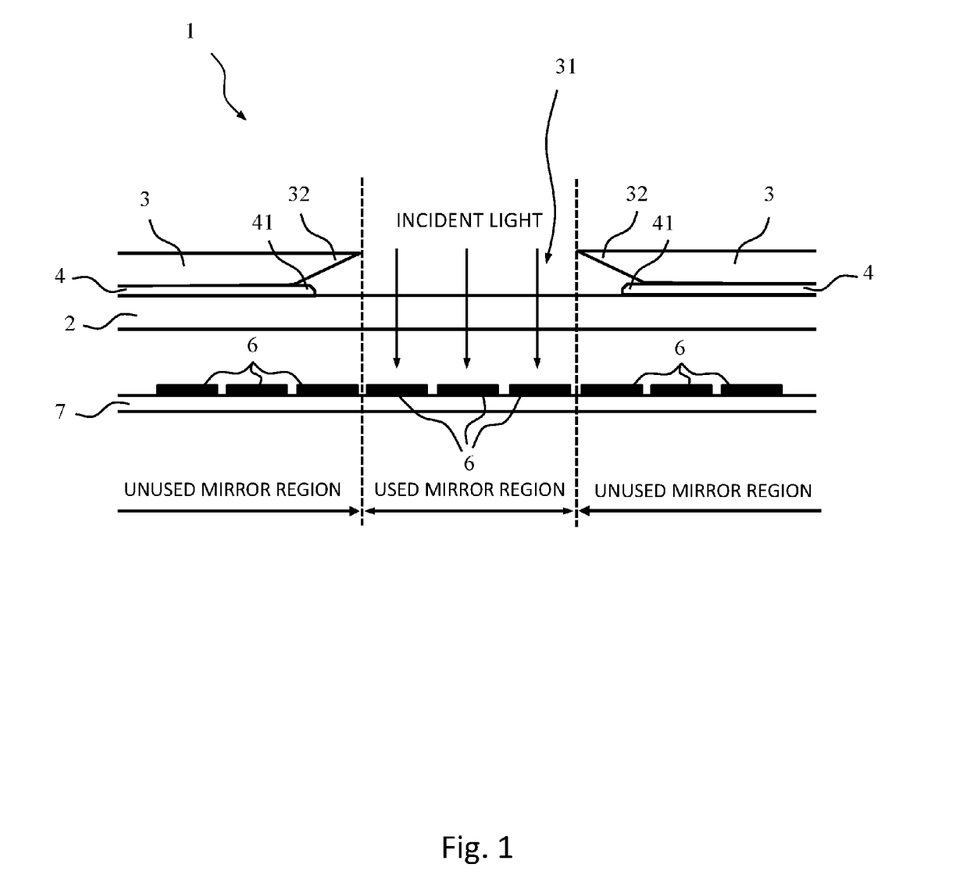
FIG. 1 is a schematic view showing an aspect of a wavelength selective switch module according to Embodiment 1 of the present invention.

(1) Configuration of Wavelength Selective Switch Module 1:

Hereinafter, a wavelength selective switch module 1 will be described as an example of an optical circuit of the present invention. FIG. 1 is a schematic view showing an aspect of the wavelength selective switch module 1 according to an embodiment 1 of the present invention. The wavelength selective switch module 1 shown in FIG. 1, for example, demultiplexes wavelength multiplexed light for each wavelength, supplies the demultiplexed wavelengths to optical elements for each wavelength, sets a deflection control amount for controlling deflection of each optical element, and can output the light through any of a plurality of output ports (not shown in FIG. 1).

The wavelength selective switch module 1 shown in FIG. 1 basically includes a transparent plate 2 through which light (incident light) from a light source (not shown in FIG. 1) can transmit, a light shielding plate 3 which is adhered onto the transparent substrate 2 with an adhesive 4 and has an opening 31 through which the incident light passes, MEMS mirrors 6 which are arranged on the side opposite to the light shielding plate 3 across the transparent plate 2 and are a plurality of optical elements receiving incident light, and a substrate 7 on which the MEMS mirrors 6 are mounted.

The transparent plate 2 which is included in the wavelength selective switch module 1 (hereinafter also referred to simply as a "module 1") of the present embodiment and is a light-transmittable plate-shaped member may be formed of a conventionally well-known transparent material, e.g. an inorganic material such as glass or sapphire, and a plastic material such as acryl.

Meanwhile, the light shielding plate 3 which is adhered and fixed to the transparent plate 2 by using the adhesive 4 and is a plate-shaped member having the opening 31 through which incident light passes may be formed of a light-shieldable opaque material, e.g. a metal material such as titanium (Ti), aluminum (Al), gold (Au), copper (Cu), and tungsten (W). Alternatively, a multilayer film mirror may be used in the light shielding plate 3. The light shielding plate 3 may be formed by depositing the above metal material on a projection 32 side of a glass plate (not shown in FIG. 1), or a multilayer film mirror may be formed as the light shielding plate.

The adhesive 4, which can adhere and fix the transparent plate 2 and the light shielding plate 3 to each other, is not particularly limited as a usable adhesive 4; and conventionally well-known adhesives 4, such as an ultraviolet curable adhesive, a thermosetting adhesive, and a two-liquid mixing type adhesive, may be suitably selectively used depending on, for example, the shape of the light shielding plate 3 and the application of the module 1.

As shown in FIG. 1, the light shielding plate 3 has the opening 31; and while the opening 31 corresponds to a region through which light can pass, a region other than the opening 31 of the light shielding plate 3 shields light (incident light) which is to enter the region.

As shown in FIG. 1, in the module 1 according to the present embodiment, the projections 32 projecting in an overhang shape toward the center of the opening 31 formed in the light shielding plate 3 are formed on the side opposite to the transparent plate 2 in the opening 31. The formation of the projection 32 in the opening 31 conceals the protrusion 41 of the adhesive 4 when the transparent plate 2 and the light shielding plate 3 are adhered to each other with the adhesive 4, thereby preventing the protrusion 41 of the adhesive 4 from adversely affecting on an optical path.

Examples of a method of processing the light shielding plate 3 to form the projection 32 in an overhang shape include dicing, polishing, and etching. When a member obtained by depositing a light shielding film, formed of a metal material, on a glass plate is used as the light shielding plate 3, dicing or polishing is adopted; and on the other hand, when the light shielding plate 3 formed of a metal material is processed, processing using etching may be performed other than dicing and polishing.

Figure 2:
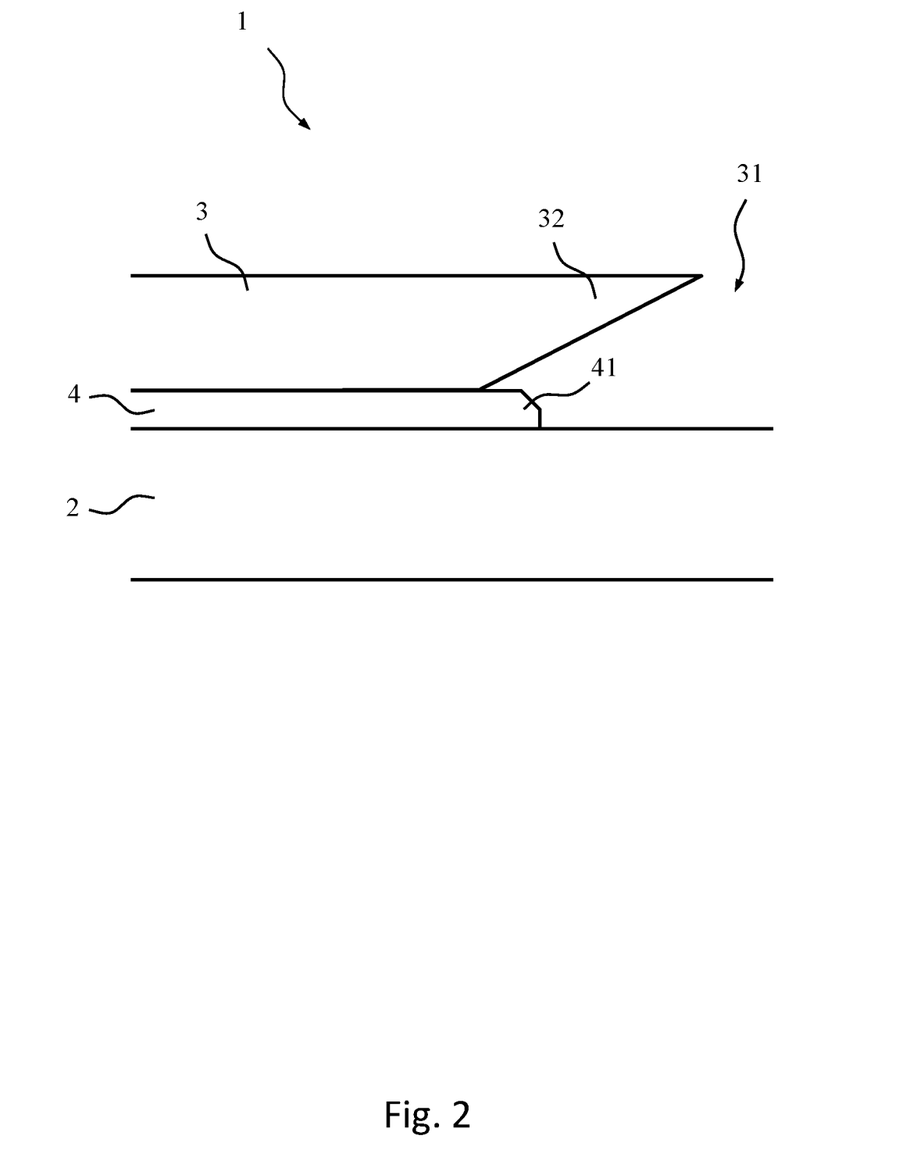
FIG. 2 is a partially enlarged view of FIG. 1 showing a periphery of a projection.

FIG. 2 is a partially enlarged view of FIG. 1 and shows a periphery of the projection 32. As shown in FIGS. 1 and 2, the projection 32 projects at an acute angle toward the center of the opening 31 in the present embodiment. The projection 32 thusly formed at an acute angle can reliably conceal the protrusion 41 of the adhesive 4. Although the angle of the tip end of the acute-angled projection 32 is not limited particularly, the angle may be determined depending on the viscosity of the adhesive 4, the thickness of the light shielding plate 3, and the wettability of the glass plate 2.

In the present embodiment, as shown in FIGS. 1 and 2, the shape of the aspect facing to the opening 31 in a cross section vertical to the light shielding plate is a shape linear from the front end on the side opposite to the transparent plate 2 toward the front end on the transparent plate 2 side. When the cross section is formed in such a linear shape, the light shielding plate 3 can be easily processed.

In the module 1 according to the present embodiment, the substrate 7 on which the MEMS mirrors 6 as optical elements are mounted is located on the side opposite to the light shielding plate 3 across the transparent plate 2 in a travelling direction of incident light from the transparent plate 2. For example, the MEMS mirrors 6 reflect incident light having a predetermined wavelength while deflecting the light toward an output port of a lens array (not shown in FIGS. 1 and 2).

In FIG. 1, in the MEMS mirrors 6, a region receiving incident light is described as a "used mirror region", and a region shielded from light by the light shielding plate 3 and thus receiving no incident light is described as an "unused mirror region". The same definitions apply to FIGS. 3 to 7.

(2) Method of Manufacturing Wavelength Selective Switch 1:

An example of means for manufacturing the wavelength selective switch 1 as a configuration shown in FIG. 1 will be described. In this example, a member obtained by depositing a light shielding film, formed of a metal material, on a glass plate (not shown in FIGs) is adopted as the light shielding plate 3, and an ultraviolet curable adhesive is used as the adhesive 4 adhering the light shielding plate 3 and the transparent plate 2.

First, the light shielding film formed of a metal material, such as titanium (Ti), aluminum (Al), gold (Au), copper (Cu), or tungsten (W), is deposited on the glass plate (not shown in FIGs) to form the light shielding plate 3. Subsequently, the obtained light shielding plate 3 is cut into a desired size that can be included in the wavelength selective switch 1.

The light shielding plate 3 which has been cut into the desired size is processed into the shape shown in FIGS. 1 and 2 to form the opening 31 having the projections 32 with an overhang shape. When the light shielding plate 3 is processed into an overhang shape, means such as dicing, polishing, and etching is considered as described above; however, when the member obtained by depositing a light shielding film, formed of a metal material, on the glass plate (not shown in FIGs) is used as the light shielding plate 3, dicing or polishing is adopted. When a light shielding film formed of a metal material is deposited on a glass plate, the projections 32 are formed on the light shielding film side.

In the dicing, the light shielding plate 3 is processed by a dicing saw (not shown in FIGs) while the dicing saw is applied on a processing surface of the light shielding plate 3 at a desired angle. In the polishing, the light shielding plate 3 is pressed against a polishing plate at a desired angle to be processed. Only one side can be processed by dicing or polishing, and therefore, for example when the opening 31 has a shape having no opening portion (a so-called window frame shape), dicing and polishing cannot be performed.

When the light shielding plate 3 is formed of a metal material, the light shielding plate 3 may be processed by etching. In the etching, the light shielding plate 3 formed of a metal material is masked with a masking tape or the like (not shown in FIGs), and an unnecessary portion is then removed after dissolution in an etching liquid.

After the light shielding plate 3 has been processed into a desired shape, the light shielding plate 3 and the transparent plate 2 are adhered to each other with the adhesive 4 (ultraviolet curable adhesive). In the adhesion therebetween, the adhesive 4 may be applied onto the transparent plate to deposit the light shielding plate 3 on an application surface of the transparent plate 2, and, thus, to allow the adhesive to be cured by ultraviolet irradiation.

Figure 3:
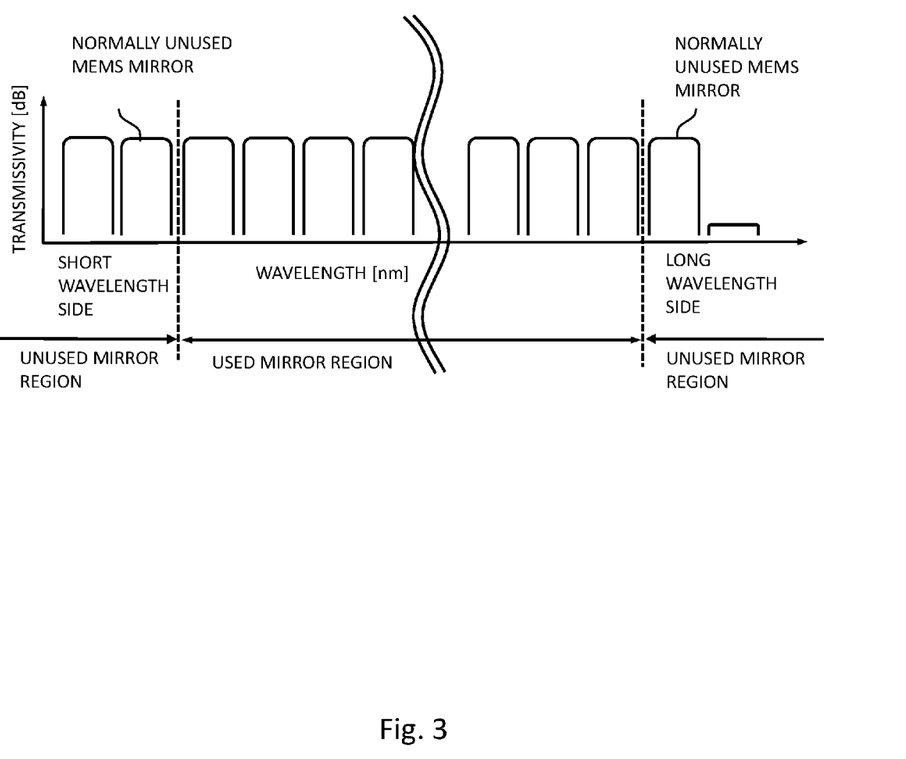
FIG. 3 is a pattern diagram for illustrating a procedure for aligning MEMS mirrors.
Figure 4:
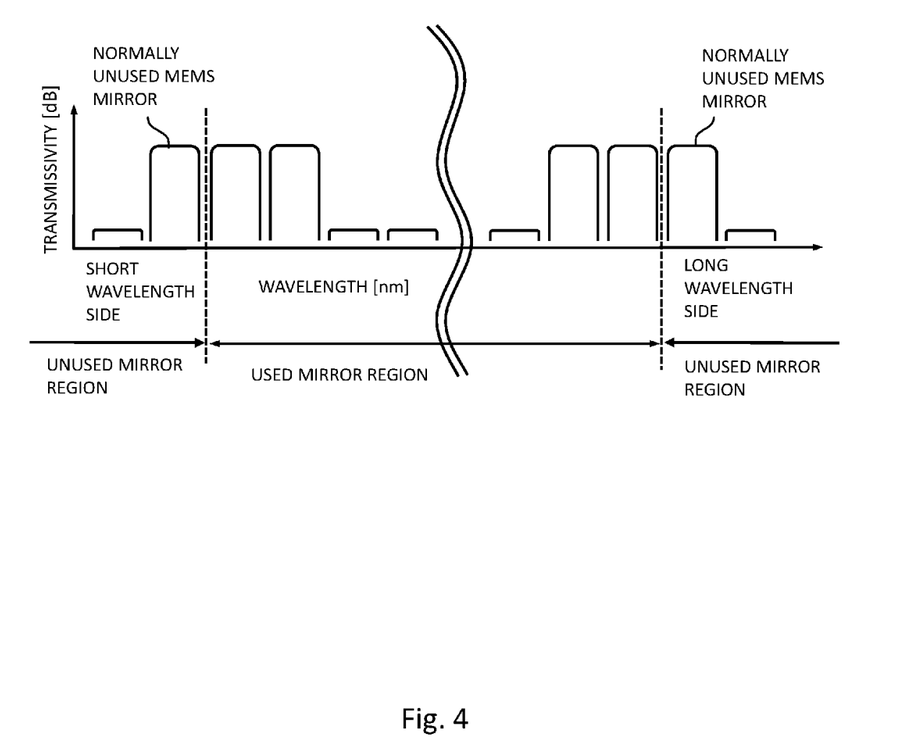
FIG. 4 is a pattern diagram for illustrating the procedure for aligning the MEMS mirrors.
Figure 5:
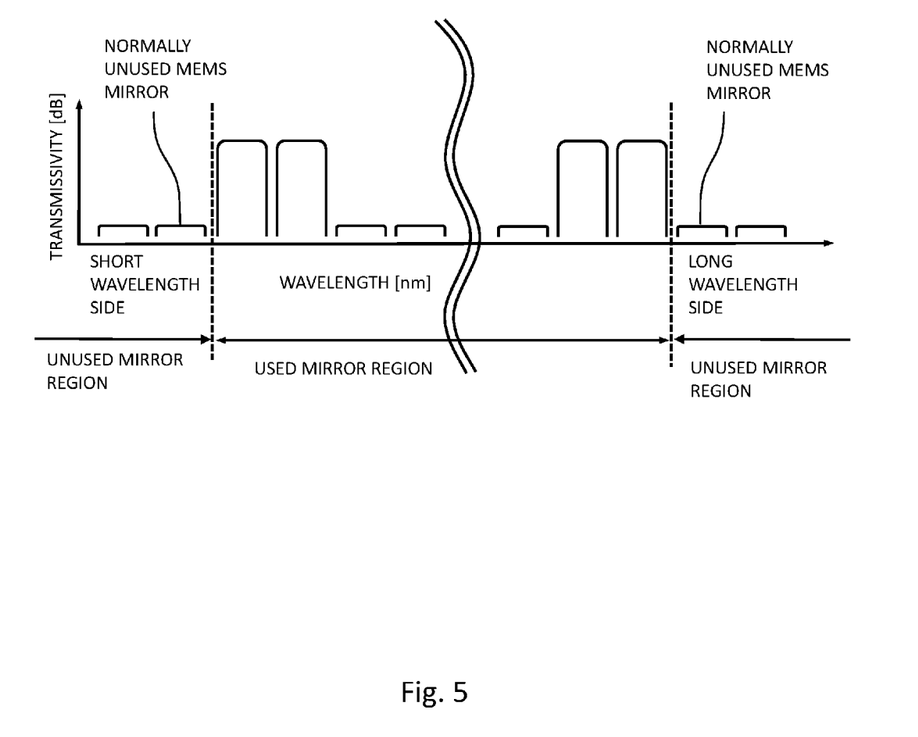
FIG. 5 is a pattern diagram for illustrating the procedure for aligning the MEMS mirrors.

Next, a method of positioning the light shielding plate 3, which has been adhered to the transparent plate 2 with the adhesive 4, and the MEMS mirrors 6 will be described. In this example, incident light is parallel light. FIGS. 3, 4, and 5 are schematic views for illustrating a procedure for aligning the MEMS mirrors 6. In FIG. 3, the horizontal axis represents wavelength, and the vertical axis represents transmissivity.

In the positioning of the MEMS mirrors 6, an ASE (Amplified Spontaneous Emission) light source, which wavelength is wider than light source used in practice, is used. When the ASE light source is irradiated to the MEMS mirrors 6, the mirrors not normally used are seen in the alignment of the MEMS mirror 6, as shown in FIG. 3, so that all the mirrors can be confirmed. In this state, an optical system is aligned so that light having a predetermined wavelength is applied to predetermined mirrors.

Subsequently, as shown in FIG. 4, the two adjacent mirrors on the shortest wavelength side in the used mirror region and the single mirror in the unused mirror region adjacent to the two mirrors on the shortest wavelength side in the used mirror region, as well as the two adjacent mirrors on the longest wavelength side in the used mirror region and the single mirror in the unused mirror region adjacent to the two mirrors on the longest wavelength side in the used mirror region are placed in a reflective state; and meanwhile, the remaining mirrors are placed in a non-reflective state. The peaks of wavelengths corresponding to the mirrors in the reflective state are searched by a spectrum analyzer to confirm the wavelengths. The six wavelengths are observed as shown in FIG. 4.

In the above state, the UV adhesive (ultraviolet curable adhesive) 4 is applied onto the transparent plate 2 to temporarily fix the light shielding plate 3, and, thus, to locate the light shielding plate 3 on the side opposite to side of the substrate 7, on which the MEMS mirrors 6 are mounted, across the transparent plate 2. A wavelength direction of the light shielding plate 3 is positioned while the wavelength of the spectrum analyzer is observed. The light shielding plate 3 is positioned to avoid loss of the mirrors on the shortest wavelength side in the used mirror region and the mirrors on the longest wavelength side in the used mirror region as well as to maximize loss of the mirrors in the unused mirror region.

After the position and the alignment are thus completed, the interposing adhesive 4 is irradiated with ultraviolet light to be cured, and, thus, to fix the light shielding plate 3, adhered to the transparent plate 2 with the adhesive 4, to the module 1.

In the positioning, for example, if incident light is parallel light, the light shielding plate 3 may be located as described below. In FIG. 1, it is desirable to locate the light shielding plate 3 so that the center of the beam of the incident light passing through the opening 31 is projected to the center of the MEMS mirror 6. In addition, it is more desirable to locate the light shielding plate 3 so that the outside end of the beam of the incident light passing through the opening 31 is projected into the MEMS mirror 6; however, the light shielding plate 3 may be located so that the outside end of the beam of the incident light is projected to an end of the MEMS mirror 6.

Figure 6:
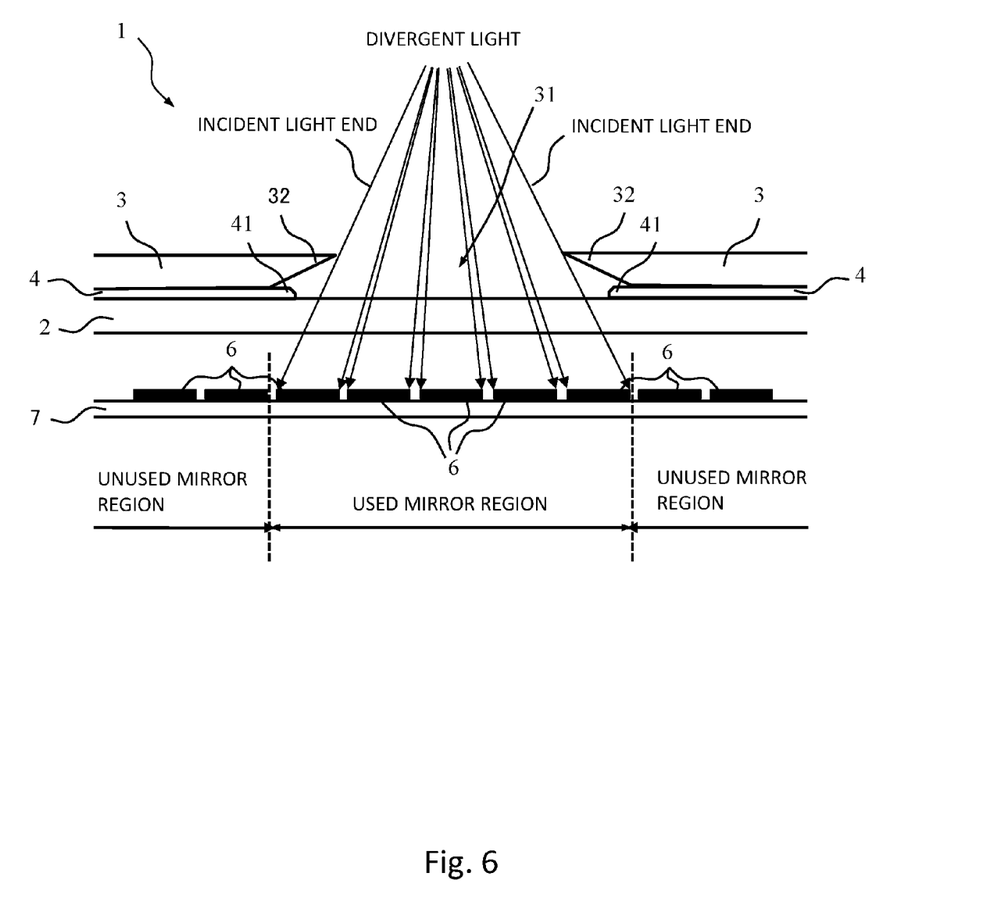
FIG. 6 is a schematic view showing a state in which a light shielding plate is located so that an outside end of a beam of the incident light which is divergent light passing through an opening is projected to a gap between the MEMS mirrors in FIG. 1.

FIG. 6 shows an example where it is assumed that the incident light is divergent light. It is desirable that the light shielding plate 3 is located so that the center of the incident light passing through the opening 31 is projected to the center of the MEMS mirror 6. In addition, it is more desirable that the light shielding plate 3 is located so that the outside end of the beam of the incident light passing through the opening 31 is projected in the MEMS mirror 6; however, the light shielding plate 3 may be located so that the outside end of the beam of the incident light is projected to the end of the MEMS mirror 6. FIG. 6 is a schematic view showing the wavelength selective switch module of FIG. 1 in a state in which the light shielding plate 3 is located so that the outside end of the beam of the incident light which is the divergent light passing through the opening 31 is projected to the end of the MEMS mirror 6. When the light shielding plate 3 is thus located with respect to the divergent light, the divergent light passing through the opening 31 of the light shielding plate 3 is efficiently irradiated to the MEMS mirrors 6.

Figure 7:
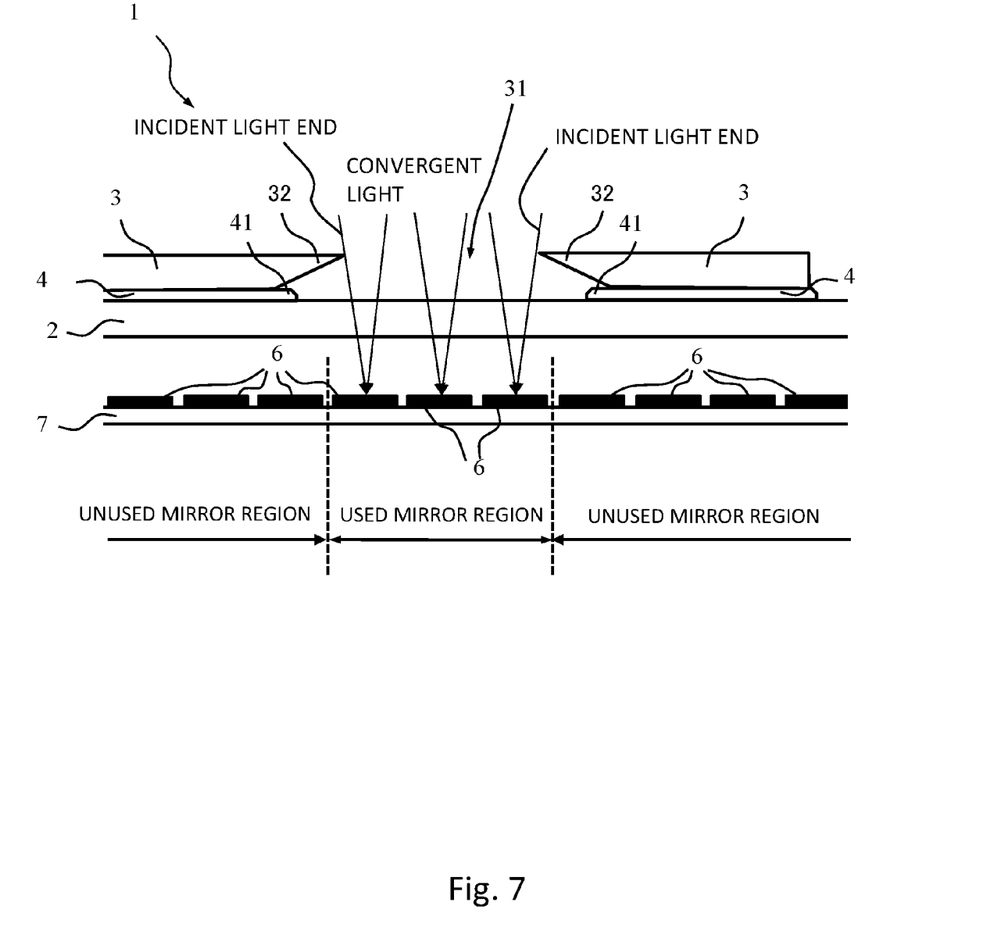
FIG. 7 is a schematic view showing a state in which a light shielding plate is located so that the center of a focused beam of incident light passing through the opening is projected to the MEMS mirrors in FIG. 1.

FIG. 7 shows an example where it is assumed that the incident light is convergent light. It is desirable that the light shielding plate 3 is located so that the center of a beam of the incident light passing through the opening 31 is projected to the center of the MEMS mirror 6. In addition, it is more desirable that the light shielding plate 3 is located so that the outside end of the beam of the incident light passing through the opening 31 is projected into the MEMS mirror 6; however, the light shielding plate 3 may be located so that the outside end of the beam of the incident light is projected to the end of the MEMS mirror 6. FIG. 7 is a schematic view showing the wavelength selective switch module of FIG. 1 in a state in which the light shielding plate 3 is located so that the center of the beam of the incident light and the outside end of the beam of the incident light passing through the opening 31 are projected to the center of the MEMS mirror 6. When the light shielding plate 3 is thus located with respect to the convergent light, the convergent light passing through the opening 31 of the light shielding plate 3 is efficiently irradiated to the MEMS mirrors 6.

In the above-described wavelength selective switch 1 as the optical circuit according to the present embodiment, on the side opposite to the transparent plate 2 in the opening 31, which is formed in the light shielding plate 3 adhered to the transparent plate 2 with the adhesive 4 and serves as a path for light, the projection 32 projecting in an overhang shape toward the center of the opening 31 is formed; and therefore, the projection 32 conceals the protrusion 41 of the adhesive 4 when the transparent plate 2, and the light shielding plate 3 are adhered to each other with the adhesive 4 and prevents the protrusion 41 of the adhesive 4 from adversely affecting on an optical path, whereby the wavelength selective switch 1 which can exercise transmission characteristics as designed can be obtained.

Embodiment 2

Figure 8:
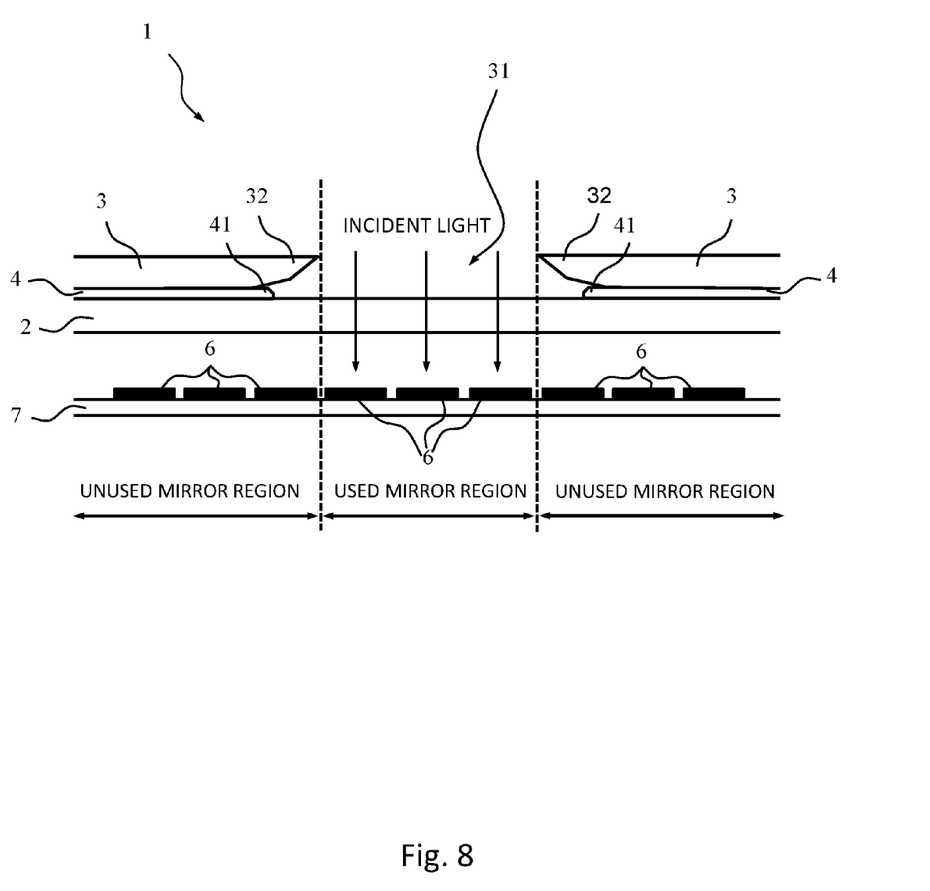
FIG. 8 is a schematic view showing an aspect of a wavelength selective switch module according to Embodiment 2 of the present invention.
Figure 9:
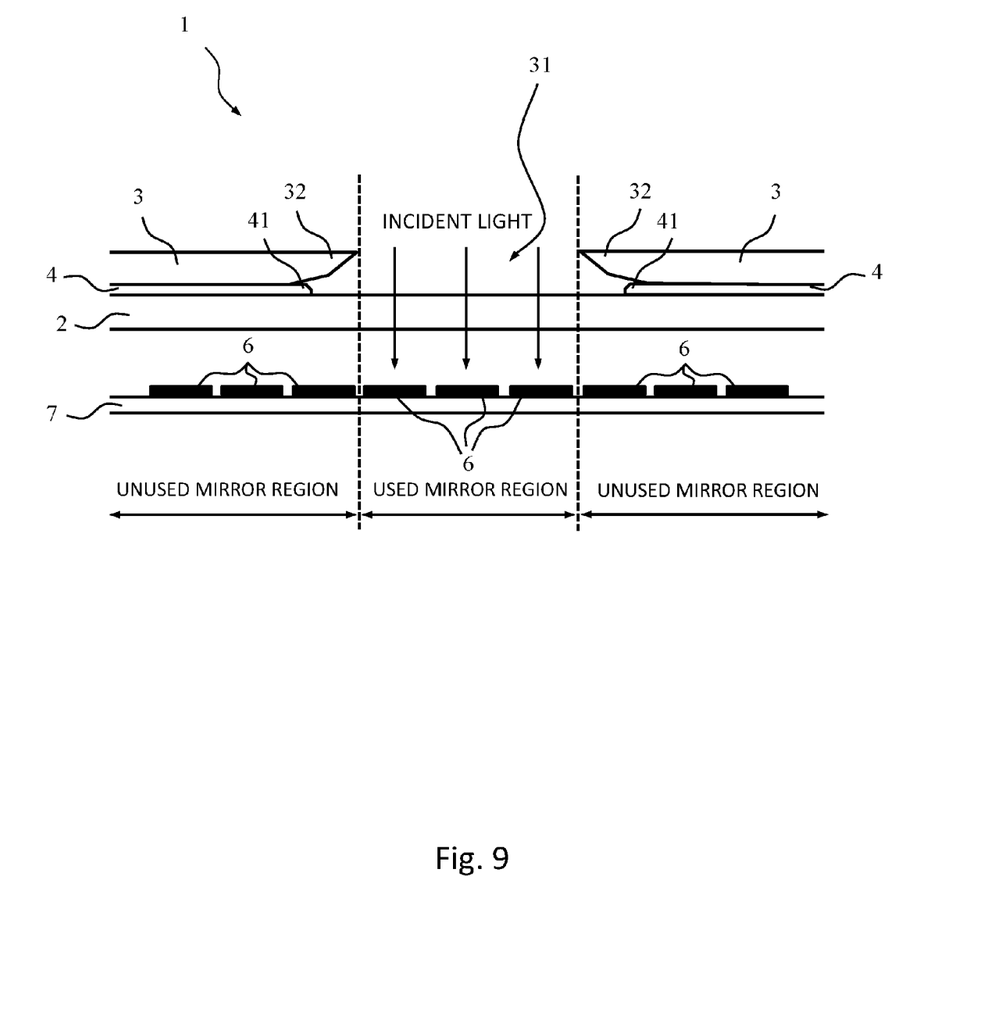
FIG. 9 is a partially enlarged view of FIG. 8 showing a periphery of a projection.

FIG. 8 is a schematic view showing an aspect of a wavelength selective switch module 1 according to Embodiment 2. FIG. 9 is a partially enlarged view of FIG. 8 and shows a periphery of a projection 32.

In the wavelength selective switch module 1 according Embodiment 1, while the light shielding plate 3 has a shape that the side opposite to the transparent plate 2 projects at an acute angle toward the center of the opening 31 formed in the light shielding plate 3 in the opening 31, the shape of the aspect facing to the opening 31 in the cross section vertical to the light shielding plate is a shape linear from the front end on the side opposite to the transparent plate 2 toward the front end on the transparent plate 2 side, and accordingly, the wavelength selective switch module 1 has been described using this aspect as an example.

Meanwhile, the wavelength selective switch module 1 according to Embodiment 2 shown in FIGS. 8 and 9 is common to Embodiment 1 in that, for the shape of the light shielding plate 3, the side opposite to the transparent plate 2 projects at an acute angle toward the center of the opening 31 in the opening 31; however the wavelength selective switch module 1 of the present embodiment is different from Embodiment 1 in that the shape of the aspect facing to the opening 31 in the cross section vertical to the light shielding plate is two straight lines crossing each other from the front end on the side opposite to the transparent plate 2 toward the front end on the transparent plate 2 side, and a portion where the two straight lines cross each other has a convex shape toward the center of the opening 31.

In the following description, the structures and members similar to those of Embodiment 1 are indicated by the same reference numerals, and the detailed description will not be repeated or will be simplified.

The wavelength selective switch module 1 according to Embodiment 2 shown in FIGS. 8 and 9 is configured so that the shape of the aspect facing to the opening 31 in the cross section vertical to the light shielding plate is two straight lines (see straight lines X and Y in FIG. 11) crossing each other from the front end on the side opposite to the transparent plate 2 toward the front end on the transparent plate 2 side. In Embodiment 1, the cross section of the aspect of the light shielding plate 3 is the linear shape from the front end on the side opposite to the side facing the transparent plate 2 toward the front end on the transparent plate 2 side; however, in the present embodiment, the cross section is the two straight lines X and Y crossing each other, whereby an angle of an edge formed by the straight line Y can be increased, so that the edge is strengthened.

Figure 11:
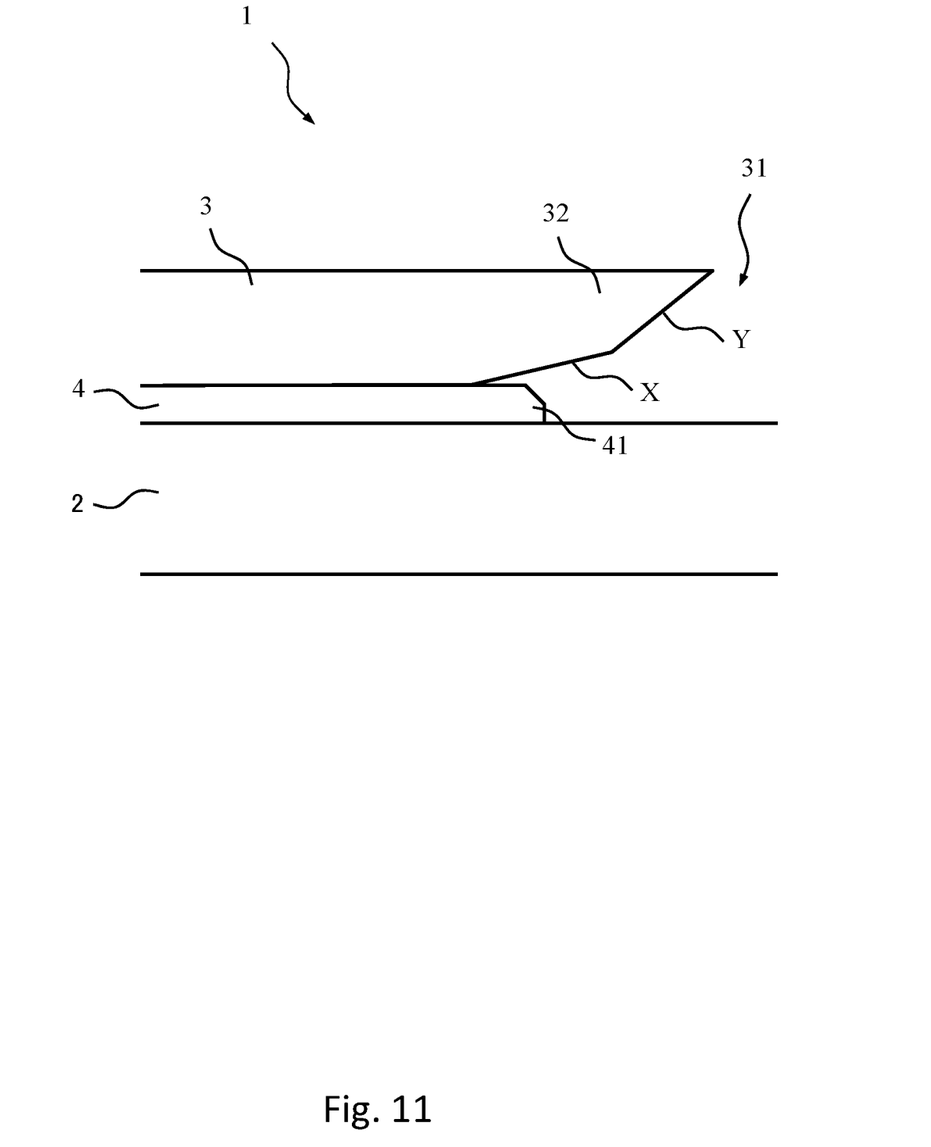
FIG. 11 is a close-up view of a portion of FIG. 9 showing one of the projections.

The portion where the two straight lines X and Y cross each other has a convex shape toward the center of the opening 31, and therefore, the protrusion 41 of the adhesive 4 can be easily concealed as compared with the linear shape. The two straight lines X and Y may have different lengths or the same length.

Variation of Embodiment

The present invention is not limited to the following embodiment, and, for example, the following modification is included in the scope of the invention.

For example, although in the above embodiments an example in which the optical circuit 1 of the present invention is applied to the wavelength selective switch module 1 has been described, the optical circuit 1 of the invention can be widely used as long as it includes a configuration in which the transparent plate 2 is adhered, with the adhesive 4, to the light shielding plate 3 having the opening 31 as a path for light.

In the above embodiments, although the MEMS mirror 6 is used as an optical element, a lens array, a liquid crystal on silicon, a wavelength blocker, or the like may be used as the MEMS mirror 6.

Other specific structures, shapes, and the like for carrying out the present invention may be replaced with other structures and the like, as long as the object of the present invention can be achieved.

INDUSTRIAL APPLICABILITY

The present invention as an optical circuit mounted on, for example, a wavelength selective switch module can be used in the fields of communication industry, electronic industry, and the like, and thus has high industrial applicability.

REFERENCE SIGNS LIST 1 optical circuit (wavelength selective switch module)
2 transparent plate
3 light shielding plate
31 opening
32 projections
4 adhesive
41 protrusion of adhesive
6 MEMS mirrors (optical elements)
7 substrate
100 conventional wavelength selective switch module
X, Y straight lines

The invention claimed is:
1. An optical circuit comprising:
a transparent plate which is light-transmittable;
a preformed light shielding plate having a top surface and an opposing bottom surface, the light shielding plate having an opening extending therethrough, the preformed light shielding plate being attached to the transparent plate with an adhesive that adheres the bottom surface of the light shielding plate to the transparent plate so that incident light passes through the opening before striking the transparent plate, wherein the light shielding plate has projections in the opening, the projections having an overhang shape extending toward the center of the opening such that the light shielding plate extends further into the opening at the top surface than at the bottom surface;
a plurality of optical elements receiving incident light; and
a substrate on which the plurality of optical elements is mounted,
wherein the substrate is located on the side opposite to the light shielding plate across the transparent plate so that the transparent plate is between the substrate and the light shielding plate.

2. The optical circuit according to claim 1,
wherein in the light shielding plate, the shape of each projection has an aspect facing to the opening in a cross section vertical to the light shielding plate, and
wherein the aspect is linear from a front end of the side of the light shielding plate opposite to the transparent plate toward a front end of the side of the light shielding plate near the transparent plate.

3. The optical circuit according to claim 1,
wherein in the light shielding plate, the shape of each projection has an aspect facing to the opening in a cross section vertical to the light shielding plate, and
wherein the aspect is two straight lines crossing each other from a front end of the side of the light shielding plate opposite to the transparent plate toward a front end of the side of the light shielding plate near the transparent plate, and a portion where the two straight lines cross each other has a convex shape toward the center of the opening.

4. The optical circuit according to claim 1,
wherein the light shielding plate is located so that the center of a beam of the incident light passing through the opening and then through the transparent plate is projected to the center of the plurality of optical elements.

5. The optical circuit according to claim 1,
wherein the light shielding plate is located so that the outside end of a beam of the incident light passing through the opening and then through the transparent plate is projected in the plurality of optical elements.

6. The optical circuit according to claim 2,
wherein the light shielding plate is located so that the center of a beam of the incident light passing through the opening and then through the transparent plate is projected to the center of the plurality of optical elements.

7. The optical circuit according to claim 2, wherein the light shielding plate is located so that the outside end of a beam of the incident light passing through the opening and then through the transparent plate is projected in the plurality of optical elements.

8. The optical circuit according to claim 3, wherein the light shielding plate is located so that the center of a beam of the incident light passing through the opening and then through the transparent plate is projected to the center of the plurality of optical elements.

9. The optical circuit according to claim 3, wherein the light shielding plate is located so that the outside end of a beam of the incident light passing through the opening and then through the transparent plate is projected in the plurality of optical elements.

10. An optical circuit comprising:
    a transparent plate which is light-transmittable, the transparent plate having an upper surface and an opposing lower surface; and
    a preformed light shielding plate positioned on the transparent plate, the light shielding plate having a top surface and an opposing bottom surface, the light shielding plate being attached to the transparent plate by an adhesive that adheres the bottom surface of the light shielding plate to the upper surface of the transparent plate, the light shielding plate having an inner surface extending between the top and bottom surfaces and bounding an opening through which incident light passes before striking the transparent plate,
    the inner surface being shaped so that the light shielding plate extends further into the opening at the top surface than at the bottom surface;
    and further comprising:
    a substrate positioned below the transparent plate so that the transparent plate is between the substrate and the light shielding plate; and
    plurality of optical elements mounted on the substrate so as to be aligned with the opening of the light shielding plate such that a beam of incident light passing down through the opening and then through the transparent plate projects onto and is received by the plurality of optical elements.

11. The optical circuit according to claim 10, wherein in a cross-section vertical to the light shielding plate, the inner surface extends linearly between the top and bottom surfaces of the light shielding plate.

12. The optical circuit according to claim 10, wherein in a cross-section vertical to the light shielding plate, the inner surface extends linearly from the top surface of the light shielding plate and linearly from the bottom surface of the light shielding plate so as to meet at a meeting point therebetween, the inner surface having a convex shape at the meeting point.

13. The optical circuit according to claim 10, wherein the plurality of optical elements and the opening of the light shielding plate are positioned with respect to each other such that a center of the beam of incident light passing through the opening and then through the transparent plate is projected to a center of the plurality of optical elements.

14. The optical circuit according to claim 10, wherein the plurality of optical elements and the opening of the light shielding plate are positioned with respect to each other such that an outside end of the beam of incident light passing through the opening and then through the transparent plate is projected to the plurality of optical elements.

15. The optical circuit according to claim 1, wherein the transparent plate is comprised of glass, sapphire, or acryl.

16. The optical circuit according to claim 1, wherein the adhesive is an ultraviolet curable adhesive, a thermosetting adhesive, or a two-liquid mixing type adhesive.

17. A method of manufacturing an optical circuit comprising:
    temporarily fixing a preformed light shielding plate to a transparent plate, the transparent plate being light-transmittable, the light shielding plate having a top surface and an opposing bottom surface, and having an opening extending therethrough, the light shielding plate being temporarily fixed to the transparent plate with an adhesive that adheres the bottom surface of the light shielding plate to the transparent plate so that incident light passes through the opening before striking the transparent plate, and having in the opening projections having an overhang shape extending toward the center of the opening such that the light shielding plate extends further into the opening at the top surface than at the bottom surface;
    while temporarily fixed to the transparent plate, adjusting the light shielding plate with respect to the transparent plate so as to align the opening with a plurality of optical elements mounted on a substrate that is on an opposite side of the transparent plate than the light shielding plate such that incident light that passes through the opening and then through the transparent plate is received by the optical elements, the light shielding plate being adjusted so that a receiving intensity of the incident light is high at a predetermined number of the optical elements and a receiving intensity of the incident light is low at the rest of the optical elements; and
    after the opening has been aligned with the optical elements, curing the adhesive to permanently fix the light shielding plate to the transparent plate.

\* \* \* \* \*